United States Patent [19]

Polomski

[11] 4,452,691
[45] Jun. 5, 1984

[54] COMBINED PROCESS FOR HEAVY OIL UPGRADING AND SYNTHETIC FUEL PRODUCTION

[75] Inventor: Robert E. Polomski, Baytown, Tex.

[73] Assignee: Mobil Oil Corporation, New York, N.Y.

[21] Appl. No.: 476,190

[22] Filed: Mar. 17, 1983

[51] Int. Cl.³ .............................................. C10G 21/16
[52] U.S. Cl. ...................... 208/86; 585/408; 585/409; 585/640
[58] Field of Search ............... 208/86, 87, 96, 309, 208/95; 585/409, 640, 733, 408

[56] References Cited

U.S. PATENT DOCUMENTS

| 3,899,544 | 8/1975 | Chang et al. | 585/408 |
| 3,951,781 | 4/1976 | Owen et al. | 208/309 |
| 4,126,538 | 11/1978 | Goudriaan et al. | 208/86 |
| 4,263,129 | 4/1981 | Chen et al. | 208/111 |
| 4,324,651 | 4/1982 | Rollmann et al. | 208/309 |

Primary Examiner—Delbert E. Gantz
Assistant Examiner—Anthony McFarlane
Attorney, Agent, or Firm—A. J. McKillop; M. G. Gilman; J. F. Powers, Jr.

[57] ABSTRACT

A process for upgrading heavy oil to fuel products comprises deasphalting the heavy oil with an oxygenated solvent and simultaneously converting the oxygenated solvent and deasphalted oil over a ZSM-5 type catalyst to produce gasoline and distillate boiling range hydrocarbons.

13 Claims, 1 Drawing Figure

Figure
OXYGENATED SOLVENT / HEAVY OIL UPGRADING PROCESS
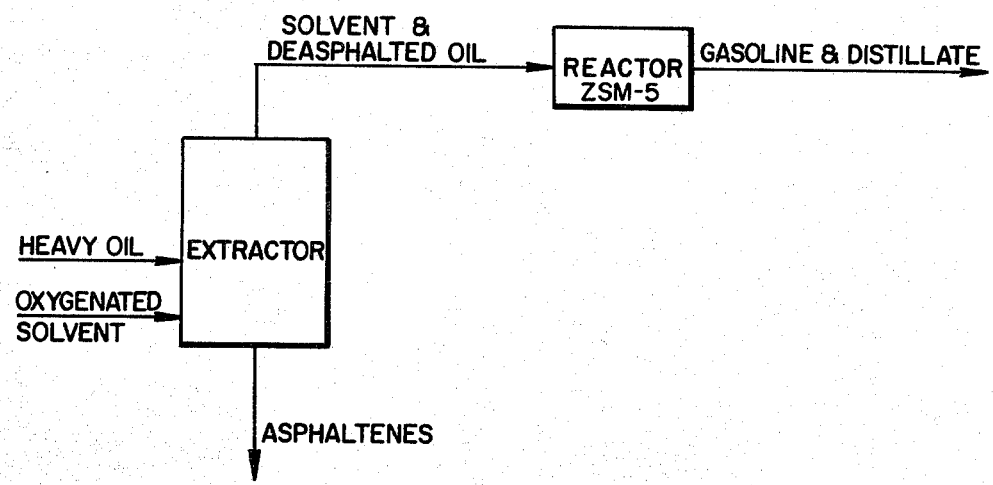

COMBINED PROCESS FOR HEAVY OIL UPGRADING AND SYNTHETIC FUEL PRODUCTION

BACKGROUND OF THE INVENTION

1. Field of the Invention

This invention relates to a novel process for upgrading heavy oils. The invention more particularly relates to an improved process for solvent deasphalting heavy oils and the production of gasoline and distillate boiling range hydrocarbons from the deasphalted oil.

2. Description of the Prior Art

It is now recognized that future energy needs will have to be satisfied at least in part by synthetic fuels production and from the upgrading of heavy petroleum feedstocks. The production of synthetic olefinic and/or aromatic high quality gasoline hydrocarbons from the catalytic conversion of various oxygenated organic compounds is well established. For example, U.S. Pat. No. 3,894,106 discloses a process for converting olefinic ethers to olefins and/or aromatics containing a greater number of carbon atoms by contacting the ether with a crystalline aluminosilicate zeolite having a silica to alumina ratio of at least about 12 and a constraint index of about 1 to 12 at elevated temperatures. The preferred catalysts are those of the ZSM-5 family. Similarly, U.S. Pat. No. 3,894,107 discloses the conversion of lower olefinic organic hetero compounds to olefinic and/or aromatic hydrocarbon compounds in the presence of ZSM-5 type of synthetic aluminosilicate molecular sieves.

U.S. Pat. No. 3,899,544 discloses the zeolite catalytic conversion of alcohols and/or ethers to gasoline boiling range hydrocarbons in which the zeolite catalyst contains about 30 to 85 percent of the total cation sites satisfied by a Lewis or Bronsted base such as elements of Group IA or VA of the Periodic Table. Particular exemplary cations disclosed include those which contain sodium, potassium, nitrogen and phosphorus, alone or in appropriate cationic complex form.

U.S. Pat. No. 3,928,483 discloses the production of gasoline boiling-range hydrocarbons from an alcohol or ether starting material. In accordance with the patent, $C_1$ to $C_3$ alcohols are converted to highly aromatic gasoline boiling-range hydrocarbons by first contacting an alcohol reactant with a condensation catalyst to produce water, heat and a predominately olefinic or organic intermediate product, and in a second stage contacting the intermediate product with a crystalline aluminosilicate zeolite having a silica to alumina ratio of at least 12 and a constraint index of 1 to 12 to convert the intermediate product to a final gasoline product which may contain some water.

The above patents are but a few of the patents relating to the conversion of lower organic compounds containing heteroatoms, such as oxygen, sulfur and/or halogen, over a special class of crystalline zeolite catalysts at elevated temperatures to form hydrocarbons in the gasoline boiling range. The conversion is typically carried out at a temperature in the range of about 500° to 1200° F., preferably at a temperature in the range of about 600° to 850° F. and at space velocities in the range of about 0.5 to 50 LHSV. The product obtained comprises water, light hydrocarbon gases ($C_4^-$) and a normally liquid hydrocarbon fraction ($C_5^+$) which contains a substantial amount, usually at least about half, of $C_6$ to $C_{10}$ monocyclic aromatic hydrocarbons.

It has recently been discovered that low acidity zeolites, especially alkali metal ZSM-5, can catalytically upgrade heavy oils such as the residual fractions of crudes higher-boiling than 600° F. to produce gasoline and distillate boiling-range hydrocarbons. U.S. Pat. No. 4,263,129 discloses converting high boiling hydrocarbon stocks to liquid products of lower boiling range over low acidity ZSM-5 type catalysts, such as NaZSM-5 at pressures ranging from at least 200 psig and temperatures ranging from 650° to 850° F.

Heavy oil feedstocks often contain large amounts of asphaltenes. Asphalt yields as high as 65 percent have been obtained from heavy crudes. Asphalts are undesirable in feeds to catalytic cracking processes because asphalts go largely to coke under process conditions. Deposition of coke on the cracking catalyst greatly reduces catalyst activity. Thus, it would be beneficial to separate the asphaltenes from the heavy oils before catalytic upgrading. Atmospheric distillation, acid treating, vacuum distillation, and solvent deasphalting have been used to separate asphalts from heavy oil feedstocks.

In solvent deasphalting processes, non-polar solvents (e.g., pentane, hexane or heptane) which have surface tensions less than 23 dynes/cm at 25° C. have been used to precipitate asphaltenes from heavy oil feedstocks. A commercially important solvent deasphalting process uses liquid propane at 100° to 210° F. and 220 to 650 psig to extract a lubricating oil base stock and precipitate resins and asphalts from petroleum resid. After thermally separating the propane solvent from the deasphalted oil, the propane is condensed and recycled to the extraction tower. However, due to the large volumes of solvent required and to the high solvent recovery cost in liquid propane deasphalting, solvent deasphalting is not typically used as a processing step for upgrading heavy oils to gasoline and distillate. Thus, solvent deasphalting of heavy oils has been primarily limited to extracting lube oil base stock.

SUMMARY OF THE INVENTION

In accordance with the present invention solvent deasphalting of heavy oil is accomplished without the need for costly solvent recovery by a process which comprises solvent deasphalting the heavy oil with oxygenated solvents, and converting the oxygenated solvent and deasphalted oil simultaneously and without solvent separation over specified aluminosilicate zeolites to produce gasoline and distillate boiling-range hydrocarbons. The process operates to simultaneously convert the oxygen-containing solvent to gasoline products and the deasphalted heavy oil to gasoline and distillate hydrocarbons under process conditions already well established and known to effect the desired conversion of the individual components. By simultaneously converting the deasphalted oil and oxygenated solvent to gasoline and distillate boiling-range hydrocarbons, solvent deasphalting can be beneficially used without the need for solvent recovery. The present invention makes economic use of solvent deasphalting for fuel production whereas solvent deasphalting heretofore has been primarily limited to extracting lubricating oil base stock. It has been contemplated to use separate facilities for synthetic fuel production and heavy oil upgrading. The deasphalting of heavy oil with oxygenated solvents and the simultaneous conversion of oxygenated solvent and heavy oil to fuel products as in the present invention eliminates the need for separate processing units.

BRIEF DESCRIPTION OF THE DRAWING

The FIGURE is a typical flow diagram for the simultaneous upgrading of oxygenated solvents and heavy oil.

DETAILED DESCRIPTION OF THE INVENTION

The heavy oils that may be solvent deasphalted and subsequently converted to gasoline and distillate include hydrocarbon feedstocks having an initial boiling point greater than about 600° F. Such heavy oils include heavy virgin petroleum crudes, atmospheric and vacuum resids, tar sands and shale oil, among others.

It is known that asphaltenes are insoluble in oxygenated solvents such as alcohols, ethers and alcohol-ether mixtures. Referring to the FIGURE in the present invention an oxygenated solvent and heavy oil are fed to an extractor 1 wherein the asphaltenes are precipitated from the dissolved oil. The deasphalted oil and solvent solution is removed from extractor 1 and the deasphalted oil and solvent are simultaneously without solvent separation converted over a crystalline aluminosilicate catalyst in reactor 2 to gasoline and distillate hydrocarbons. As discussed previously, it is well known that oxygenated solvents are converted to gasoline and distillate boiling-range hydrocarbons over ZSM-5 catalysts. Likewise, heavy oils and resid can be processed over ZSM-5 to yield lower boiling gasoline and distillate as disclosed in U.S. Pat. No. 4,263,129.

Suitable solvents for use in this invention are lower aliphatic alcohols preferably straight or branched alkanols such as methanol, ethanol, iso and normal propanol, butanol, pentanol, hexanol, cyclohexanol, heptanol, octanol such as 2-ethylhexanol and iso-octanol and unsaturated counterparts. Similarly, $C_2$ to $C_{20}$ aliphatic ethers are useful. Also within the scope of the present invention are aliphatic solvents containing heteroatoms besides oxygen, including nitrogen, halogen and sulfur analogs of the oxygenated solvents. For example, methyl mercaptan, methyl amine, ethyl mercaptan, n-butyl amine, cyclohexanol amine, methyl sulfide, etc., as well as mixtures thereof, and mixtures of the aforesaid alcohols and ethers and other materials as aforesaid may be used so long as the asphaltenes will be precipitated from the solvated heavy oil.

In accordance with the present invention, the deasphalted oil and solvent are brought without solvent separation into contact, under conversion conditions, with a catalyst comprising a crystalline aluminosilicate zeolite having a silica to alumina ratio of at least about 12 and a constraint index within the approximate range of 1 to 12. Non-limiting examples of useful crystalline aluminosilicate zeolites include ZSM-5, ZSM-11, ZSM-12, ZSM-35 and ZSM-38.

The synthesis and characteristics of zeolite ZSM-5 are described in U.S. Pat. No. 3,702,886, issued Nov. 14, 1972, the disclosure of which is incorporated herein by reference.

The synthesis and characteristics of zeolite ZSM-11 are described in U.S. Pat. No. 3,709,979, issued Jan. 9, 1973, the disclosure of which is incorporated herein by reference.

The synthesis and characteristics of zeolite ZSM-12 are described in U.S. Pat. No. 3,832,449, issued Aug. 27, 1974, the disclosure of which is incorporated herein by reference.

The synthesis and characteristics of zeolite ZSM-35 are described in U.S. Pat. No. 4,016,245, issued Apr. 5, 1977, the disclosure of which is incorporated herein by reference.

The synthesis and characteristics of zeolite ZSM-38 are described in U.S. Pat. No. 4,046,849, the entire contents of which are herein incorporated by reference.

Although the zeolites herein described have unusually low alumina contents, i.e., high silica to alumina ratios, they are very active even when the silica to alumina ratio exceeds 30. The activity is surprising since catalytic activity is generally attributed to framework aluminum atoms and cations associated with these aluminum atoms. These catalysts retain their crystallinity for long periods in spite of the presence of steam and high temperature which induces irreversible collapse of the framework of other zeolites, e.g., of the X and A type. Furthermore, carbonaceous deposits when formed, may be removed by burning at higher than usual temperature to restore activity. In many environments the zeolites of this class exhibit very low coke forming capability, conducive to very long times on stream between burning regenerations.

An important characteristic of the crystal structure of the zeolites for use herein is that they provide constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalysts useful in this invention possess, in combination: a silica to alumina ratio of at least about 12; and a structure providing constrained access to the crystalline free space.

The silica to alumina ratio referred to may be determined by conventional analysis. This ratio is meant to represent as closely as possible, the ratio in the rigid anionic framework of the zeolite crystal and to exclude aluminum in the binder or in cationic or other form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e., they exhibit "hydrophobic" properties. It is believed that this hydrophobic character is advantageous in the present invention.

The type of zeolites useful in this invention freely sorb normal hexane and have a pore dimension greater than about 5 Angstroms, or, if eliptical in pore shape, at least the size of the pores in ZSM-5. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section of normal hexane is excluded and the zeolite is not of the desired type. Windows of 10-membered rings are preferred, although, in some instances, excessive puckering or pore blockage may render these catalysts ineffective. 12-membered rings do not generally appear to offer sufficient constraint to produce the advantageous conversions. Also, structures can be conceived due to pore blockage or other cause, that may be operative.

Rather than attempt to judge from the crystal structure whether or not a catalyst possesses necessary constrained access, a simple determination of the "constraint index" may be made by passing continuously a mixture of an equal rate of normal hexane and 3-methylpentane over a small sample, approximately 1 gram or less of catalyst at atmospheric pressure according to the following procedure. A sample of the catalyst, in the form of pellets or extrudate, is crushed to a particle size of about that of coarse sand and mounted in a glass tube. Prior to testing, the catalyst is treated with a stream of air at 1000° F. for at least 15 minutes. The catalyst is then flushed with helium and the temperature adjusted between 550° and 950° F. to give an overall conversion between 10 and 60 percent. The mixture of hydrocarbons is passed at 1 liquid hourly space velocity (i.e., 1 volume of liquid hydrocarbon per volume of catalyst per hour) over the catalyst with the helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons. The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index in the approximate range of 1 to 12. Constraint Index (CI) values for some typical catalysts, including those useful herein, are:

| Crystalline Aluminosilicate | CI |
|---|---|
| ZSM-5 | 8.3 |
| ZSM-11 | 8.7 |
| ZSM-12 | 2 |
| ZSM-35 | 2 |
| ZSM-38 | 2 |
| Beta | 0.6 |
| ZSM-4 | 0.5 |
| H-Zeolon | 0.5 |
| REY | 0.4 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° to 950° F., with accompanying conversion between 10 and 60%, the constraint index may vary within the indicated approximate range of 1 to 12. Likewise, other variables such as the crystal size of the zeolite, the presence of possbily occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° to 950° F., the constraint index will have a value for any given zeolite of interest herein within the approximate range of 1 to 12.

The specific zeolites described, when prepared in the presence of organic cations, are catalytically inactive, possibly because the intracrystalline free space is occupied by organic cations from the forming solution. They may be activated by heating, for example, in an inert atmosphere at 1000° F. for 1 hour, followed by base exchange with ammonium salts and by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-35 and ZSM-38, with ZSM-5 particularly preferred.

In a preferred aspect of this invention, the catalysts hereof are selected as those having a crystal framework density, in the dry hydrogen form, of not substantially below about 1.6 grams per cubic centimeter. It has been found that zeolites which satisfy all three of these criteria are most desired for the present process. Therefore, the preferred catalysts of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April, 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal, or in mercury under pressure (mercury porosimeter). It is possible that the unusual sustained activity and stability of this class of zeolite is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

|  | Void | Framework |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ionic exchange and calcination of the ammonium form to yield the hydrogen form. In addition to the hydrogen form, other forms of the zeolite wherein the original alkali metal has been replaced by other metal cations may be used. Thus, the original alkali metal of the zeolite may be replaced by ion exchange with other suitable cations of the metals of Groups I through VIII of the Periodic Table, including, by way of example, nickel, copper, zinc, palladium, calcium or rare earth metals.

In practicing the desired conversion process, it may be desirable to incorporate the above-described crystalline aluminosilicate zeolite in another material resistant to the temperature and other conditions employed in the process. Such matrix materials include synthetic or naturally occurring substances as well as inorganic materials such as clays, silica and/or metal oxides. The latter may be either naturally occurring or in the form of gelatinous precipitates or gels including mixtures of silica and metal oxides. Naturally occurring clays which can be composited with the zeolite can include those of the montmorillonite and kaolin families, which families include the sub-bentonites and kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, silica-titania, as well as ternary compositions, such as silica-alumina-thoria, silica-alumina-zirconia, silica-alumina-magnesia, and silica-magnesia-zirconia. The matrix may be in the form of a cogel. The relative proportions of zeolite components and inorganic oxide gel matrix may vary widely with the zeolite content ranging from between about 1 to about 99 percent by weight and more usually in the range of about 5 to about 80 percent by weight of composite.

Alternatively, the catalyst used in the present invention may be a low acidity form of the class of zeolites described above which have been found to be extremely active in the acid form. Thus, for use in the present invention, the very high acidities inherent in zeolites such as zeolite ZSM-5 can be drastically reduced. Preferably, the acidity is reduced by extensive ion exchange with sodium or other alkali metal. However, the alkali metal cation content should in no case be so large as to substantially eliminate the activity of the zeolite for the catalysis being employed in the instant invention. For example, a completely sodium exchanged HZSM-5 appears to be largely inactive for shape selective conversions required in the present invention. The invention may also be practiced with such zeolites of very high silica to alumina mole ratios or by steaming the active form of the zeolite. It will be recognized by those skilled in the art of zeolite catalysis that such a substitution of sodium or like cations and steaming are generally recognized as means to "poison" a zeolite catalyst by severely impairing its activity.

The degree of acid activity of zeolite catalysts can be measured and compared by means of the alpha scale. The alpha scale reflects the relative activity of the catalyst with respect to a high activity silica-alumina cracking catalyst. To determine the alpha value as such term is used herein, n-hexane conversion is determined at a suitable temperature between about 290° to 540° C., preferably at about 540° C. Conversion is varied by variation in space velocity such that a conversion level of up to about 60 percent of n-hexane is obtained and converted to a rate constant per unit volume of the zeolite and compared with that of silica-alumina catalyst which is normalized to a reference activity of 540° C. Catalytic activity of the catalysts are expressed as multiple of the standard, i.e. the silica-alumina standard which has a rate constant of 0.016 sec$^{-1}$ in conversion of n-hexane at 540° C. The silica-alumina reference catalyst contains about 10 weight percent $Al_2O_3$ and the remainder $SiO_2$. This method of determining the alpha is more fully described in the *Journal of Catalysis*, Vol. VI, pages 278-287, 1966.

Zeolites which are useful according to the invention may have low alpha values, less than about 10. Alpha values substantially lower than unity are also preferred. As noted, the low acid activity may be achieved by using the zeolites of very high silica to alumina mole ratios or by severe high temperature steaming of zeolites having lower silica to alumina mole ratios. For example, zeolite ZSM-5 which has a ratio of 40 may be treated with 100 percent steam at 1200° F. for a period of several hours adequate to reduce the acid activity to the necessary level.

Preferably, if low acid activity zeolites are used, the low acidity is achieved by extensive ion exchange of the zeolite with sodium or other alkali metal cations. Sodium content of the zeolites will vary inversely with the silica to alumina mole ratios since it is the aluminum atoms which provide cationic sites suitable for acceptance of the alkali metal ion.

Depending on that ratio, sodium content may vary between 0.4 and 5.2 weight percent of the zeolite, with preferred sodium contents ranging between 0.75 and 3.4 weight percent sodium as metal. Content of the other alkali metals will vary from those numbers on a weight basis in proportion to atomic weights. Alkali metal content providing about 30 to 85 percent, preferably about 60 to 82 percent of the total cation sites of the aforementioned zeolite is desirable.

Various alkali metal salts can be used to provide cations in the ion exchange of the zeolite to produce low acidity forms, including but not limited to NaOH, $NaNO_3$, $NaHCO_3$, etc.

Generally, the alphaltenes will be precipitated from the heavy oil at an extracting temperature ranging from about 80° to about 700° F., more preferably at 100° to 500° F. and at a pressure ranging from about 0 to about 600 psig, with a range of 50 to 400 psig preferred. Depending upon the asphalt content of the heavy oil feedstock, the oxygenated solvent: oil volume ratio will be in the range of about 1 to about 20. A more preferred range of oxygenated solvent to oil is about 2 to about 10.

In the reactor in which the oxygenated solvent and dissolved deasphalted oil are converted to gasoline and distillate in the presence of a zeolite catalyst such as ZSM-5 or low acidity form thereof, process conditions will include a temperature ranging from about 450° to about 1000° F., more preferably 550° to 800° F., a pressure from about 100 to about 3000 psig with 300 to 2000 psig preferred and a liquid hourly space velocity of about 0.1 to about 20.0. A LHSV of about 0.1 to 8 is preferred. The optimum conditions of operation for any given feed will vary some with the particular characteristics of the feed and the oxygenated or heteroatom-containing solvent utilized.

The reaction product from the reactor will contain olefinic and aromatic gasoline and distillate boiling-range hydrocarbons. Distillate product will have use as diesel fuel, jet fuel, No. 2 fuel oil and the like. The product may also contain some unreacted solvent as well as gaseous hydrocarbons boiling below the boiling range of gasoline hydrocarbons. The gasoline and distillate hydrocarbon products may be separated from each other and from other components of the reaction product by any suitable means such as distillation.

What is claimed is:

1. A process for converting a high boiling hydrocarbon feedstock to liquid products of lower boiling range which comprises contacting said feedstock with an oxygenated solvent for a time sufficient to precipitate asphaltenes from said feedstock wherein the oxygenated solvent: oil volume ratio is greater than about 5, and without separating said solvent from said deasphalted feedstock, contacting said solvent-containing deasphalted hydrocarbon feedstock with a crystalline zeolite characterized by a silica to alumina mole ratio greater than about 12 and having a constraint index within the approximate range of 1 to 12 to convert said oxygenated solvent to gasoline products and produce gasoline and distillate boiling range hydrocarbons from said deasphalted oil.

2. The process of claim 1 wherein said oxygenated solvent comprises alcohols, ethers and alcohol/ether mixtures.

3. The process of claim 1 wherein said crystalline zeolite is ZSM-5.

4. The process of claim 1 wherein the acid activity of said zeolite measured by the alpha scale is less than 10.

5. The process of claim 4 wherein the ion exchanged sites of said zeolite are essentially occupied by alkali metal cations.

6. The process of claim 5 wherein said alkali metal is sodium.

7. The process according to claim 6 wherein said zeolite is ZSM-5.

8. The process of claim 1 wherein said hydrocarbon feedstock is deasphalted at 80° to 700° F. and at a pressure of 0 to 600 psig.

9. The process of claim 8 wherein said hydrocarbon feedstock is deasphalted at 100° to 500° F. and at a pressure of 50 to 400 psig.

10. The process of claim 1 wherein said oxygenated solvent-containing deasphalted oil is contacted with said zeolite at 450° to 1000° F., a pressure of 100 to 3000 psig and a space velocity of 0.1 to 20 LHSV.

11. The process of claim 10 wherein said oxygenated solvent-containing deasphalted oil is contacted with said zeolite at 550° to 800° F., a pressure of 300 to 2000 psig and a space velocity of 0.1 to 8 LHSV.

12. The process of claim 1 wherein said hydrocarbon feedstock is deasphalted at 80° to 700° F. and at a pressure of about 0 to 600 psig, and said oxygenated solvent-containing deasphalted feedstock is converted at 450° to 1000° F., at a pressure of 100 to 3000 psig and a space velocity of 0.1 to 20 LHSV.

13. The process of claim 1 wherein said oxygenated solvent: oil volume ratio is in the range of about greater than 5 to about 20.

* * * * *